(12) United States Patent
Pellacuru

(10) Patent No.: US 7,334,125 B1
(45) Date of Patent: Feb. 19, 2008

(54) FACILITATING SECURE COMMUNICATIONS AMONG MULTICAST NODES IN A TELECOMMUNICATIONS NETWORK

(75) Inventor: Chinna Narasimha Reddy Pellacuru, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1126 days.

(21) Appl. No.: 09/996,948

(22) Filed: Nov. 27, 2001

(51) Int. Cl.
*H04L 9/00* (2006.01)

(52) U.S. Cl. .................. 713/163; 380/277; 380/278; 380/279; 713/155

(58) Field of Classification Search ............. 713/163, 713/156, 171, 175, 155; 709/228; 380/277–278
See application file for complete search history.

(56) References Cited

U.S. PATENT DOCUMENTS

| | | |
|---|---|---|
| 4,200,770 A | 4/1980 | Hellman et al. |
| 4,531,020 A | 7/1985 | Wechselberger et al. |
| 4,578,531 A | 3/1986 | Everhart et al. |
| 4,776,011 A | 10/1988 | Busby |
| 4,881,263 A | 11/1989 | Herbison et al. |
| 5,309,516 A | 5/1994 | Takaragi et al. |
| 5,351,295 A | 9/1994 | Perlman et al. |
| 5,361,256 A | 11/1994 | Doeringer et al. |
| 5,491,750 A | 2/1996 | Bellare et al. |
| 5,588,060 A | 12/1996 | Aziz |
| 5,588,061 A | 12/1996 | Ganesan et al. |
| 5,600,642 A | 2/1997 | Pauwels et al. |
| 5,630,184 A | 5/1997 | Roper et al. |
| 5,633,933 A | 5/1997 | Aziz |
| 5,663,896 A | 9/1997 | Aucsmith |

(Continued)

FOREIGN PATENT DOCUMENTS

EP    0 952 718 A2    10/1999

(Continued)

OTHER PUBLICATIONS

Sparta, Inc., Internet-Draft entitled "Group Secure Association Key Management Protocol", dated Mar. 2001, www.ietf.org/internet-drafts/draft-ietf-msec-gaskmp-sec-00.txt, (pp. 1-47).

(Continued)

*Primary Examiner*—Nasser Moazzami
*Assistant Examiner*—Fikremariam Yalew
(74) *Attorney, Agent, or Firm*—Hickman, Palermo, Truong & Becker

(57) ABSTRACT

An approach for facilitating secure communications among multicast nodes in a telecommunications network is disclosed. A source node sends an encryption key and an identifier to an authoritative node that stores the encryption key and associates the identifier with the encryption key. The source node encrypts data using the encryption key and sends the encrypted data with the identifier in a multicast. The multicast destination nodes retrieve the encryption key from the authoritative node based on the identifier and then decrypt the multicast. A list of administrative nodes, a list of authorized nodes, and an expiration time may be used to manage the encryption key. The authoritative node may be a certificate authority or key distribution center, and the source node may encrypt the multicast using the Internet security protocol (IPsec) or secure socket layer (SSL). Thus, communications among multicast nodes may be efficiently secured in a scalable manner.

34 Claims, 4 Drawing Sheets

U.S. PATENT DOCUMENTS

| | | | |
|---|---|---|---|
| 5,666,415 | A | 9/1997 | Kaufman |
| 5,724,425 | A | 3/1998 | Chang et al. |
| 5,748,736 | A | 5/1998 | Mittra |
| 5,761,305 | A | 6/1998 | Vanstone et al. |
| 5,805,578 | A | 9/1998 | Stirpe et al. |
| 5,832,229 | A | 11/1998 | Tomoda et al. |
| 5,841,864 | A | 11/1998 | Klayman et al. |
| 5,850,451 | A | 12/1998 | Sudia |
| 5,889,865 | A | 3/1999 | Vanstone et al. |
| 5,920,630 | A | 7/1999 | Wertheimer et al. |
| 5,982,898 | A * | 11/1999 | Hsu et al. ............... 713/156 |
| 5,987,131 | A | 11/1999 | Clapp |
| 6,009,274 | A | 12/1999 | Fletcher et al. |
| 6,049,878 | A | 4/2000 | Caronni et al. |
| 6,055,575 | A | 4/2000 | Paulsen et al. |
| 6,088,336 | A | 7/2000 | Tosey |
| 6,119,228 | A | 9/2000 | Angelo et al. |
| 6,151,395 | A | 11/2000 | Harkins |
| 6,195,751 | B1 * | 2/2001 | Caronni et al. ............ 713/163 |
| 6,216,231 | B1 | 4/2001 | Stubblebine |
| 6,226,383 | B1 | 5/2001 | Jablon |
| 6,240,188 | B1 | 5/2001 | Dondeti et al. |
| 6,240,513 | B1 | 5/2001 | Friedman et al. |
| 6,247,014 | B1 | 6/2001 | Ladwig et al. |
| 6,256,733 | B1 | 7/2001 | Thakkar et al. |
| 6,263,435 | B1 | 7/2001 | Dondeti et al. |
| 6,272,135 | B1 | 8/2001 | Nakatsugawa |
| 6,275,859 | B1 * | 8/2001 | Wesley et al. ............ 709/229 |
| 6,279,112 | B1 | 8/2001 | O'Toole, Jr. et al. |
| 6,289,455 | B1 * | 9/2001 | Kocher et al. ............. 713/194 |
| 6,295,361 | B1 | 9/2001 | Kadansky et al. |
| 6,330,671 | B1 * | 12/2001 | Aziz ........................ 713/163 |
| 6,332,163 | B1 | 12/2001 | Bowman-Amuah |
| 6,360,269 | B1 * | 3/2002 | Mamros et al. ............ 709/228 |
| 6,363,154 | B1 | 3/2002 | Peyravian et al. |
| 6,483,921 | B1 | 11/2002 | Harkins |
| 6,507,562 | B1 | 1/2003 | Kadansky et al. |
| 6,570,847 | B1 | 5/2003 | Hosein |
| 6,584,566 | B1 | 6/2003 | Hardjono |
| 6,629,243 | B1 * | 9/2003 | Kleinman et al. ......... 713/163 |
| 6,633,579 | B1 | 10/2003 | Tedijanto et al. |
| 6,636,968 | B1 | 10/2003 | Rosner et al. |
| 6,643,773 | B1 * | 11/2003 | Hardjono ................... 713/153 |
| 6,684,331 | B1 * | 1/2004 | Srivastava ................. 713/163 |
| 6,745,243 | B2 | 6/2004 | Squire et al. |
| 6,782,475 | B1 | 8/2004 | Sumner |
| 6,901,510 | B1 | 5/2005 | Srivastava |
| 6,912,656 | B1 * | 6/2005 | Perlman et al. ............. 713/170 |
| 6,917,685 | B1 | 7/2005 | Watanabe et al. |
| 6,987,855 | B1 | 1/2006 | Srivastava |
| 2002/0059516 | A1 * | 5/2002 | Turtiainen et al. .......... 713/153 |
| 2003/0026433 | A1 * | 2/2003 | Matt ......................... 380/278 |
| 2003/0044017 | A1 | 3/2003 | Briscoe |
| 2003/0163700 | A1 * | 8/2003 | Paatero ..................... 713/175 |
| 2005/0097317 | A1 * | 5/2005 | Trostle et al. .............. 713/163 |

FOREIGN PATENT DOCUMENTS

EP  0 994 600 A2  4/2000

OTHER PUBLICATIONS

Bellare, Mihir et al., "Verifiable Partial Key Escrow," Proceedings of the Fourth Annual Conference on Computer and Communications Security, ACM, 1997, (Nov. 1996).

Chappell, David, "Understanding Microsoft Windows 2000 Distributed Services—Chapter 8, Component Services: COM+," 2000, pp. 319-324.

Cylink Corporation, "Alternatives to RSA: Using Diffie-Hellman with DSS," 11 pages.

Diffie, Whitfield et al., "New Directions in Cryptography," IEEE Transactions On Information Theory, vol. IT-22, No. 6 (Nov. 1976), pp. 644-654.

Diffie, Whitfield, "The First Ten Years of Public-Key Cryptography," Proceedings of the IEEE, vol. 76, No. 5 (May 1988).

Federal Information Processing Standards Publication 185 (Feb. 9, 1994) entitled "U.S. Department of Commerce/National Institute of Standards and Technology", Escrowed Encryption Standard, Category: Telecommunications Security.

Koblitz, Neal, "A Course in Number Theory and Cryptography," Springer-Verlag New York Inc, 1994, 2nd Edition. 22-23.

Menezes, Alfred J., "Handbook of Applied Cryptography," 1997, CRC Press LLC, pp. 519-520.

Micali, Silvio, "Guaranteed Partial Key-Escrow", MIT/LCS/TM-537, Laboratory for Computer Science (Aug. 1995), Handout #13, 14 pages.

Newton , Harry, Newton's Telecom Dictionary, 1998, Telecom Books, 14th Edition, p. 228.

Orfali, Robert et al., "The Essential Distributed Objects Survival Guide—Part 5., OLE/COM Under the Hood," 1996, pp. 448-449.

Orfali, Robert et al., "Client/Server Survival Guide Third Edition—Part 7., Client/Server With Distributed Objects," 1999, p. 488.

Schneier, Bruce, "Applied Cryptography," 1996, John Wiley & Sons, Inc., pp. 33-35 and 47-85.

* cited by examiner

FACILITATING SECURE COMMUNICATIONS AMONG MULTICAST NODES IN A TELECOMMUNICATIONS NETWORK

FIELD OF THE INVENTION

The present invention generally relates to computer-based cryptography. The invention relates more specifically to facilitating secure communications among multicast nodes in a telecommunications network.

BACKGROUND OF THE INVENTION

In a distributed telecommunications network, communications among the "nodes" that comprise the network may use encryption protocols to secure communications among the nodes. As used herein, the term "node" refers to any device, apparatus, or mechanism that is part of a network.

Achieving secure communications in a distributed network requires a process for management and distribution of "encryption keys," sometimes referred to as "keys," to encrypt and decrypt communications. As used herein, the term "encryption key" refers to digital data that is used with an encryption algorithm to secure communications.

Two primary technologies may be used to secure the communications: public key (or asymmetric key) technology and symmetric (or shared key) technology. Public key technology uses public key—private key pairs, as described below. Shared keys are sometimes referred to as secret keys or private keys, with the latter not to be confused with the private keys of the public-private key pair in public key approaches.

Typically, these technologies for securing communications are associated with security infrastructure elements that are based on digital certificates that are generated based on exchanges of public keys (a "public key infrastructure" or "PKI") or on exchanges of shared keys. PKI uses asymmetric or public key cryptography for identity management. The term "asymmetric" is used because of the application of two inverse keys comprising a public key and a private key. These keys are termed inverse because one key (e.g., the public key) is used to encrypt data while the other key (e.g., the private key) is used to decrypt the encrypted data. A public key is a key that is publicly known. A private key is known only to one party or a limited group of parties and is used to decrypt data that is encrypted with an associated public key. A shared key is shared between parties but is not generally known to the public. The parties that know the shared key use it to both encrypt and decrypt communications. Additional information on symmetric and asymmetric cryptography appears in B. Schneier, "Applied Cryptography" (New York: John Wiley and Sons, 2d ed. 1996).

In general, a trusted third party can provide a mechanism for exchanging keys. For example, in a Kerberos encryption system, a "key distribution center" or "KDC" may be used to exchange shared keys. The KDC is sometimes referred to as a key exchange authority or key exchange center. The KDC facilitates the exchange of shared keys by generating a shared key for two or more parties, and then sending the selected shared key to each party via encrypted messages to each party. The messages to each party may be encrypted with other shared keys known only to the KDC and each respective party. After the KDC distributes the new shared key to the parties, the parties can communicate without going through the KDC.

As another example, with PKI, a "certificate authority" or "CA" is typically employed. The CA establishes the identity of a particular node by binding the name of the particular node to a public key in a construct called a "certificate." The certificate generally includes at least the following information: a version number, a serial number, the method used to sign the certificate (e.g., Rivest-Shamir-Adleman or RSA, or Digital Signature Algorithm or DSA), the name of the issuer of the certificate (e.g., the entity whose private key "signed" or encrypted the certificate), the valid time period during which the issuer will keep records for the certificate, the "subject name" that identifies the person, company, or node whose public key material is included in the certificate, and the subject's public key and public key method (e.g., RSA, DSA, or Diffie-Hellman).

Because there is only one private key associated with a public key, and the private key is used by a particular node, the CA can assure other entities that the public key is bound to the particular node. For example, the particular node can authenticate itself by proving knowledge of the private key that is associated with the public key, for example, by encrypting information that can be verified by the public key. The encrypted information is known as a digital signature, which can be created because the private key is only known to the particular node whose identify is bound in the certificate. Furthermore, a secured communication can be sent to the particular node by encrypting the contents of the communication using the public key from the particular node's certificate. Only the particular node of the associated private key may then decrypt the message.

Other nodes can trust that the certificate is valid because the CA digitally signs the certificate with the CA's private key to indicate authenticity. The signature of the CA can be verified by checking the digital signature against the public key certificate of the CA.

The CA, or an associated "registration authority" or "RA," can issue and revoke certificates. Registration with the CA or RA is usually performed out of band (i.e., outside of the telecommunications network) by establishing the node's identity to the CA's satisfaction, such as by a telephone call or registration form that is provided (e.g., mailed, faxed, delivered, etc.) with required identification documentation. A "certificate revocation list" or "CRL" may be provided to enable a node to determine whether a certificate is still valid or has been revoked, such as by querying a revocation server that has the CRL.

Two nodes may establish secure communications using public key certificates that each node has registered. Typically, the public keys are used to establish a shared key that can be used to establish an encrypted communications channel, such as a virtual private network (VPN). For example, at the application level, the Secure Socket Layer (SSL) or Transport Layer Security (TLS) may be used. As another example, below the application level the Internet Protocol Security (IPsec) technology may be used. IPsec is typically implemented in two parts. The first part uses a two-phase approach based on the Internet Key Exchange (IKE) protocol, in which the first phase uses unencrypted exchanges to establish a set of shared keys to use in the second phase. The shared keys from the first phase are used in the second phase to establish encryption parameters for use in the second part for bulk encryption of the data to be exchanged. The first part is often referred to as the IKE security association (IKE SA) and the second part as the IPsec SA.

Communications over a telecommunications network may be classified based on how many nodes receive a communication as follows: unicast, multicast, and broadcast. With unicast communications, a single packet is sent from a source node to a destination node on a network. With multicast communications, a single data packet is copied by a source node and sent to a specific group of recipient nodes on the network. The source node addresses the packet with a multicast address, sends the packet to the network, and the network makes copies of the packet and sends a copy to each recipient node that is associated with the multicast address. Recipients of the multicast may act as a source node and send multiple copies of the packet to another group of nodes. With broadcast communications, the packet is addressed using a broadcast address so that the network will make and send a copy to every node on the network.

Regardless of the communication type, a particular communication may originate from another node besides the source node, such as from a user on a local area network (LAN) that is connected to the Internet via the source node. For example, in a multicast, the source node may be a router acting as a multicast originator and that connects the LAN to the Internet. Also, the recipient nodes may not be the ultimate destination of a communication, such as a communication to a user on a LAN that is connected to the Internet via a particular recipient node. For example, in a multicast, the recipient node may be a router acting as a multicast receiver and that connects a LAN to the Internet.

Secured communications can be achieved for unicast communications using the asymmetric and symmetric key approaches discussed above. For example, two nodes can establish secure communications using IPsec in which IKE is used by the nodes to negotiate the bulk encryption parameters for the unicast communication.

However, securing communications for multicast communications is more difficult than with unicast communications because in a multicast there are multiple destination, or recipient, nodes for each source, or origination, node. For example, while a pair of origination and destination nodes may negotiate back and forth in a unicast to achieve an agreed set of encryption parameters, negotiations rapidly increase in complexity with a multicast because the origination node must negotiate with a set of potentially many destination nodes. If all nodes are to use the same set of encryption parameters, the negotiations may be lengthy, as all nodes must agree on the encryption parameters. The negotiations over encryption parameters for a multicast may involve using key trees and graphs to arrive at a suitable encryption approach, which increases the complexity of establishing secured communications and consumes limited network resources. If different encryption parameters may be used by the origination node with particular groups of destination nodes, then the multicast only achieves the benefit of the more efficient multicast communication with those nodes using the same set of parameters, since the origination node must send a different multicast to each group of destination nodes.

Based on the foregoing, it is desirable to provide improved techniques for securing communications among multicast nodes.

SUMMARY OF THE INVENTION

The foregoing needs, and other needs and objects that will become apparent for the following description, are achieved in the present invention, which comprises, in one aspect, a method for facilitating secure communications among multicast nodes in a telecommunications network. A request is received from a node to store an encryption key, and the request includes an identifier. The node may be a router acting as a multicast originator. The node uses the encryption key to encrypt data that is multicast with the identifier to a set of nodes. The set of nodes may be a group of routers acting as multicast receivers. In response to the request, the encryption key is stored at an authoritative node that creates and stores an association between the encryption key and the identifier. A request to obtain the encryption key is received from at least one of the set of nodes, and the request includes the identifier. Based on the identifier from the request and the association between the encryption key and the identifier, the encryption key is retrieved and sent to the requesting node for use in decrypting the encrypted data sent in the multicast.

According to other aspects that may be included in or more embodiments, the request to store the encryption key is a request to register a certificate that identifies the encryption key and a multicast session identifier. An expiration time is associated with the encryption key to control use of the encryption key, and when the encryption key expires, the encryption key is refreshed by sending a request to the authoritative node to store a new encryption key. A list of authorized nodes is used to control the distribution of the encryption key. A list of administrative nodes is used to control which nodes can administer the multicast session, such as registering the certificate and modifying the certificate such as by refreshing the encryption key or modifying the list of authorized nodes. The request to store the encryption key is in a message that is encrypted with a public key of the authoritative node and signed with a private key of the node sending the request. The request to obtain the encryption key is in a message that is encrypted with the public key of the authoritative node and signed with a private key of the node requesting the key. The authoritative node sends the encryption key in response to the request in a message that is encrypted with a public key of the node requesting the encryption key and signed with a private key of the authoritative node.

In other aspects, the invention encompasses a computer apparatus, a computer readable medium, and a carrier wave configured to carry out the foregoing steps.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF THE INVENTION

A method and apparatus for facilitating secure communications among multicast nodes in a telecommunications network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

Figure 1:
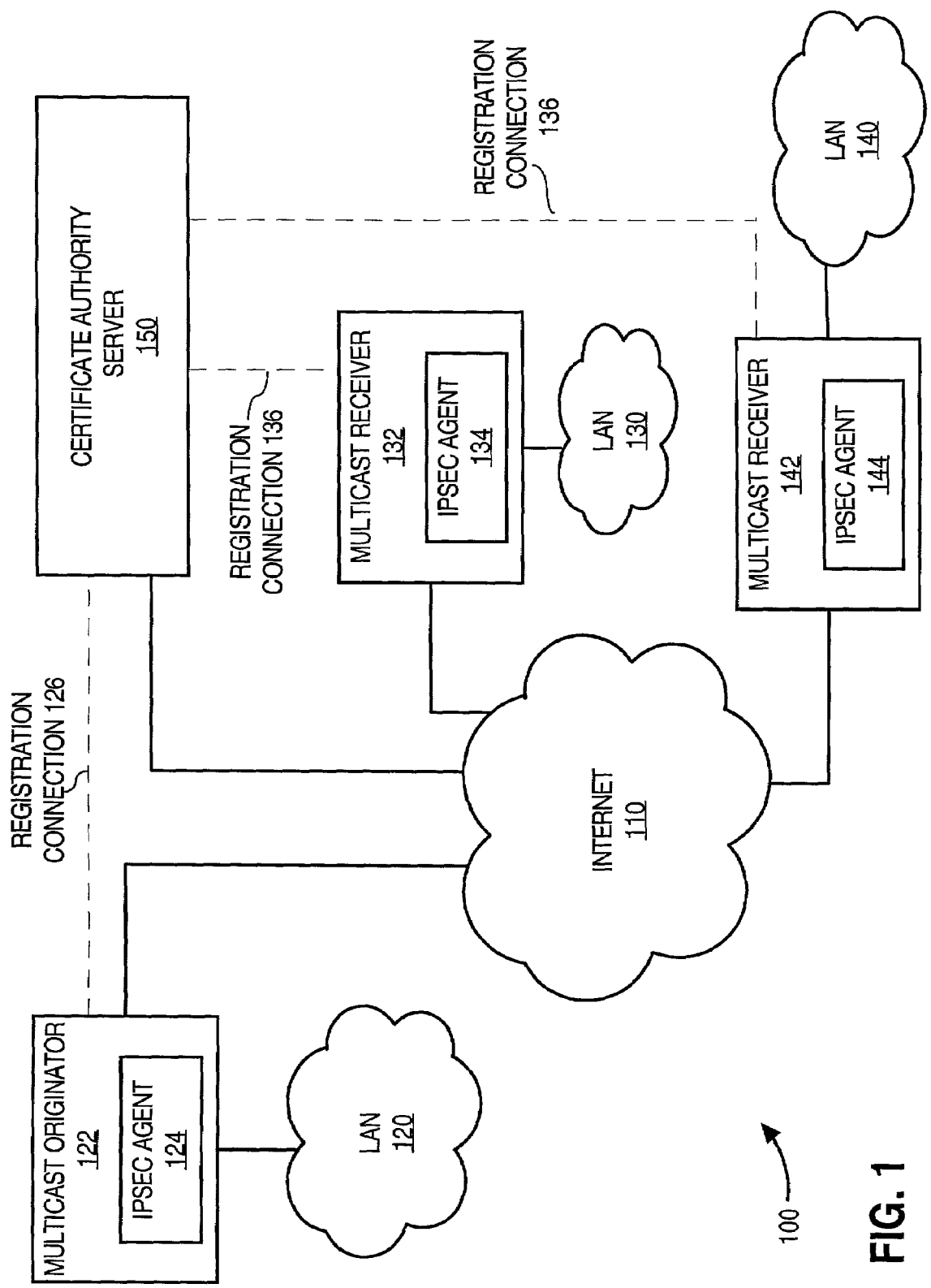
FIG. 1 is a logical block diagram of an infrastructure that may implement the techniques described herein for securing communications among multicast nodes, according to an embodiment.

Embodiments are described herein according to the following outline:

I. Structural and Functional Overview
   A. Example Infrastructure for Securing Multicast Communications
   B. Example Method for Facilitating Secure Multicast Communications
II. GENERATING MULTICAST ENCRYPTION CONFIGURATION PARAMETERS
   A. Session Keys
   B. Session Identifiers
   C. Encryption Protocols
   D. Other Parameters
III. SENDING A SESSION KEY TO AN AUTHORITATIVE NODE
IV. REGISTERING A SESSION CERTIFICATE AT AN AUTHORITATIVE NODE
V. RETRIEVING A SESSION KEY FROM AN AUTHORITATIVE NODE
VI. ACCESS LIST OF AUTHORIZED NODES
VII. LIST OF ADMINISTRATIVE NODES
VIII. EXPIRATION OF A SESSION KEY
IX. ADDITIONAL FEATURES
   A. Addition and Removal of Nodes from a Multicast
   B. Authenticating the Origin of a Multicast
   C. Multicast Trees
X. HARDWARE OVERVIEW
XI. EXTENSIONS AND ALTERNATIVES I. Structural and Functional Overview A. Example Infrastructure for Securing Multicast Communications According to one embodiment, a key management infrastructure is provided that overcomes issues of prior approaches in securing communications among multicast nodes. FIG. 1 is a logical block diagram of an infrastructure 100 that can be used to implement the techniques described herein for securing communications among multicast nodes, according to an embodiment. While FIG. 1 depicts a limited number of networks and devices arranged in a particular configuration, the techniques described herein may be implemented with any number of networks and devices, including but not limited to multicast source nodes and multicast destination nodes, which are arranged in any type of configuration.

The term "multicast communications" is used herein to denote communications among multicast nodes. Furthermore, other terms are sometimes used in practice and herein to refer to communications among multicast nodes, such as "multicast transmissions" and "multicast traffic," and such terms are synonymous with the term "multicast communications" herein. In addition, the term "multicast session" or simply "multicast" is used herein to refer to one or more multicast communications that communicate a set of data. A multicast session may be associated with one or more "multicast session identifiers" or simply a "session identifiers," which are defined and described below.

FIG. 1 depicts an internetwork designated as Internet 110. The techniques described herein are not limited to the Internet, and other networks may be used in place of or in addition to Internet 110. Internet 110 is communicatively coupled to LAN 120 through multicast originator 122 and to LANs 130, 140 through multicast receivers 132, 142, respectively. In this example, multicast originator 122 is assumed to have received a message, such as from a user connected through LAN 120, that is to be multicast to multicast receivers 132, 142.

Multicast originator 122 and multicast receivers 132, 142 may be implemented as routers that perform the functions of a source node for a multicast and destination nodes of the multicast, respectively. Multicast originator 122 and multicast receivers 132, 142 may also function as gateways for controlling access between Internet 110 and another network, such as LANs 120, 130, 140, respectively, and as a result, multicast originator 122 and multicast receivers 132, 142 may be referred to as "security gateways."

Multicast originator 122 and multicast receivers 132, 142 include IPsec agents 124, 134, 144, respectively, that perform encryption and decryption of the multicast. The techniques described herein are not limited to IPsec and other encryption approaches may be employed in place of or in addition to IPsec. For example, when multicast originator 122 receives a communication for multicast from a user of LAN 120, IPsec agent 124 can encrypt the multicast according to the techniques described herein. When the encrypted multicast is received by multicast receiver 132, IPsec agent 134 decrypts the multicast prior to distribution to one or more users that are associated with LAN 130.

FIG. 1 also depicts a certificate authority server 150, which is an example of an authoritative node, although other types of authoritative nodes, such as a KDC, may be used. As used herein, the term "authoritative node" refers to a node that facilitates secure communications among multicast nodes by storing and distributing an encryption key or keys for a multicast. The authoritative node may be replicated, load balanced, mirrored, or otherwise configured to handle the volume of communications sent to and from the authoritative node, including those communications described herein for facilitating the distribution of encryption keys for communications among multicast nodes.

Certificate authority server 150 is communicatively coupled to Internet 110 to facilitate communications within infrastructure 100, such as communications between certificate authority server 150 and multicast originator 122 and multicast receivers 132, 142.

Furthermore, multicast originator 122 and multicast receivers 132, 142 are communicatively coupled to certificate authority server 150 by registration connections 126, 136, 146, respectively. Registration connections 126, 136, 146 may be implemented as out of band communication arrangements to facilitate registration of multicast originator 122 and multicast receivers 132, 142 with certificate authority server 150. Typically, registration includes proving the identity of the individual, company, organization, or other entity associated with a node and requesting that the CA issue a certificate for a public key that is bound to the identity of the entity requesting registration.

For example, multicast originator 122 may be registered with certificate authority server 150 by a system administrator associated with multicast originator 122. The system administrator telephones an operator associated with certificate authority server 150 to provide identity documentation for multicast originator 122. After the system administrator has established the identify for multicast originator 122 to the satisfaction of the registration procedures of the CA that operates certificate authority server 150, the CA issues a certificate that binds the identity associated with multicast originator 122 to the public key of multicast originator 122. Multicast originator 122 can then distribute the certificate to other devices or entities, such as multicast receivers 132, 142, who can trust the authenticity of the public keys contained in the certificate and can verify that the certificate has not been revoked based on checking a certificate revocation list (CRL).

B. Example Method for Facilitating Secure Multicast Communications

Figure 2A:
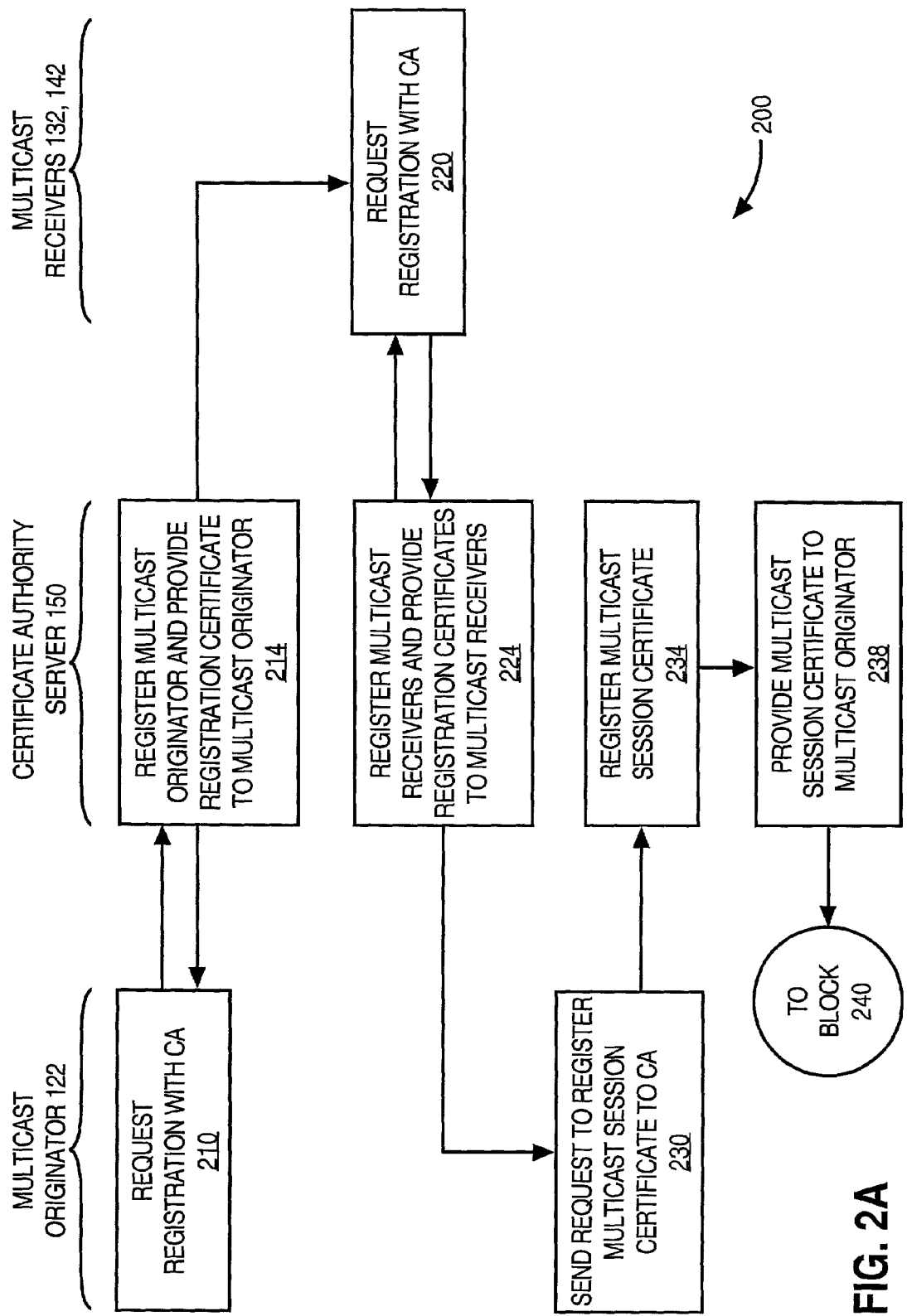
FIG. 2A and FIG. 2B are flow diagrams that depict an implementation of the techniques described herein for securing communications among multicast nodes using a multicast originator, a certificate authority server, and a multicast receiver, according to an embodiment.
Figure 2B:
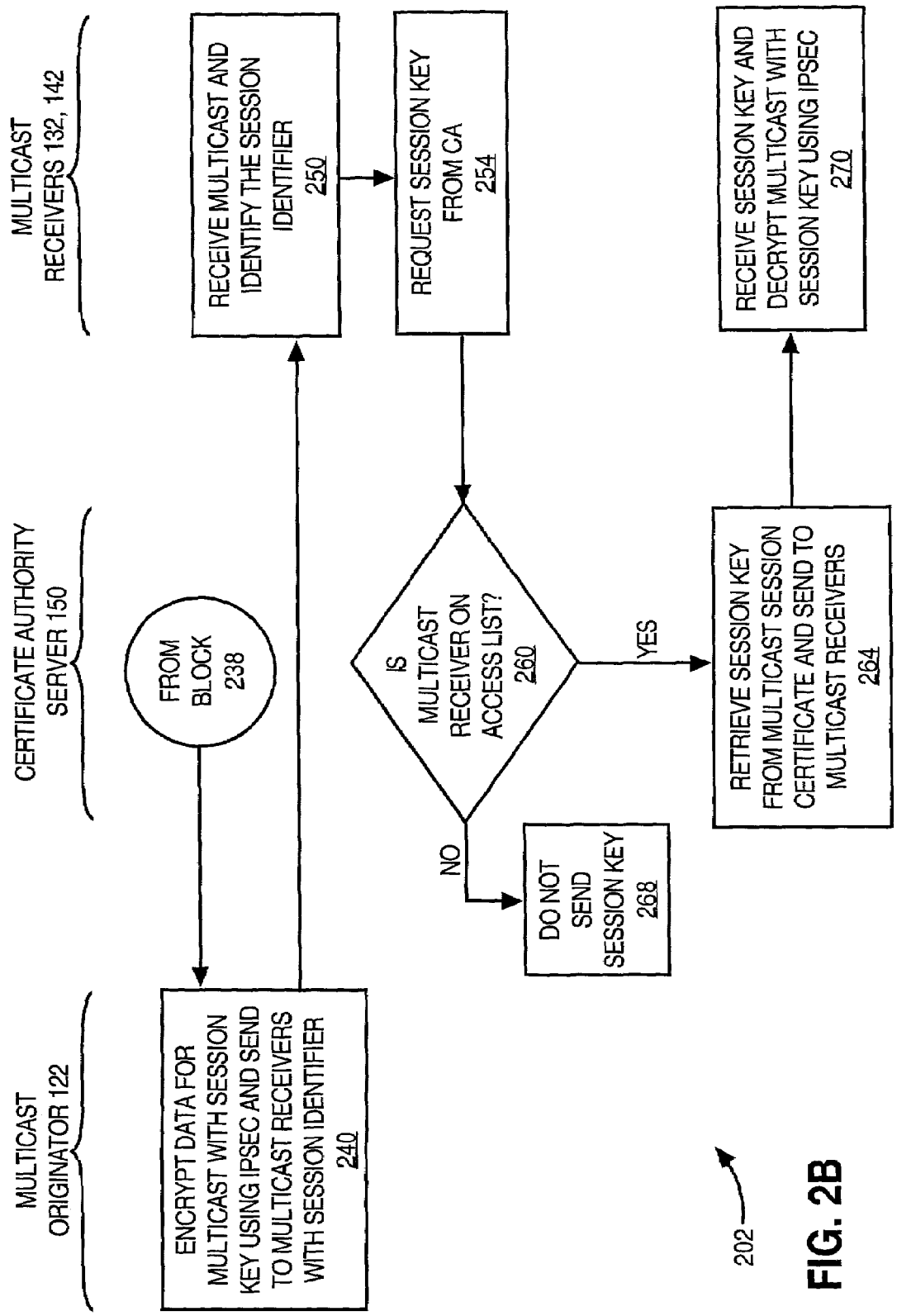

According to one embodiment, a method of facilitating secure communications among multicast nodes in a telecommunications network is provided. FIG. 2A and FIG. 2B are flow diagrams 200 and 202, respectively, that depict an implementation of the techniques described herein for securing communications among multicast nodes using a multicast originator, a certificate authority server, and a multicast receiver, according to an embodiment. While FIG. 2A and FIG. 2B depict a particular series of actions in a particular order, the techniques described herein are not limited to those actions and the order of FIG. 2A and FIG. 2B, and fewer or more actions may be included and different orderings may be used. Also, for simplicity, flow diagrams 200 and 202 are described with reference to multicast originator 122, certificate authority server 150, and multicast receivers 132, 142, although the techniques of FIG. 2A and FIG. 2B are not limited to such devices, nor to the embodiment depicted in FIG. 1.

In block 210, multicast originator 122 requests registration with the CA, and certificate authority server 150 registers multicast originator 122 in response to the request, as depicted by block 214. For example, a system administrator associated with multicast originator 122 may use registration connection 126, which may involve an out of band communication, such as mailing a registration form with required documentation to the CA. Upon review of the documentation, the CA creates a registration certificate on certificate authority server 150 and provides the certificate to multicast originator 122. Similarly, in block 220, multicast receivers 132, 142 request registration with the CA, and in block 224, certificate authority server 150 generates and sends the requested certificate to multicast receivers 132, 142.

As a result of the registrations, multicast originator 122 and multicast receivers 132, 142 may provide the registered public keys to others for encrypting messages, and then each of multicast originator 122 and multicast receivers 132, 142 can decrypt the messages using the private key that is associated with the registered public for each multicast node. In addition, multicast originator 122 and multicast receivers 132, 142 can each provide a digital signature based on each multicast node's private key, and the recipients of the digitally signed communications can verify the signature using the registered public key for the multicast node that sends the communication.

In block 230, multicast originator 122 sends a request to register a multicast session certificate to certificate authority server 150. The techniques described herein are not limited to registering a multicast session certificate, and other approaches for generating and storing the required information to facilitate the sharing of encryption keys among multicast nodes may be used. For this example, assume that the request includes a session key, a session identifier, an access list, and a list of administrative nodes. The session key is an encryption key to be used by multicast originator 122 in encrypting multicast communications sent to multicast receivers 132, 142. The session identifier is used to identify and distinguish the particular multicast session from other multicast sessions. The access list identifies other nodes, such as multicast receivers 132, 142, as being authorized to receive the encryption key from the CA. The list of administrative nodes identifies the nodes that can administer the multicast session. As a result, only administrative nodes can register and modify the contents of the multicast session certificate.

The request from multicast originator 122 to certificate authority server 150 may be encrypted by multicast originator 122 using a public key associated with certificate authority server 150 and signed by multicast originator 122 using the private key that is associated with the public key registered by multicast originator 122 with certificate authority server 150 in blocks 210 and 214.

In block 234, certificate authority server 150 registers the multicast session certificate. For example, certificate authority server 150 may create and store a record that identifies the session key, the multicast session identifier, the access list, and the list of administrative nodes. In block 238, certificate authority server 150 provides the multicast session certificate to multicast originator 122.

In block 240, multicast originator 122 encrypts data for the multicast with the session key using IPsec and sends the encrypted data to multicast receivers 132, 142 using a multicast communication that includes the session identifier. While this example uses IPsec for establishing secure communications between multicast originator 122 and multicast receivers 132, 142, other techniques may be used, such as SSL/TSL.

In block 250, multicast receivers 132, 142 receive the multicast that contains the encrypted data from multicast originator 122, and multicast receivers 132, 142 identify the session identifier.

In block 254, multicast receivers 132, 142 request the session key from certificate authority server 150. For example, multicast receivers 132, 142 may send a request to certificate authority server 150 that includes the session identifier that multicast receivers 132, 142 identify from the multicast in block 250. The request may be encrypted by multicast receivers 132, 142 using a public key associated with certificate authority server 150 and signed by multicast receivers 132, 142 using the private key that is associated with the public key registered by multicast receivers 132, 142 with certificate authority server 150 in blocks 220 and 224.

Note that a particular multicast receiver may have received the multicast but may not be on the access list in the multicast session certificate. For example, the particular multicast receiver may have been sent the multicast by mistake, or the particular multicast receiver may have been on the access list originally, but was subsequently removed, for example, due to a request from multicast originator 122. Assume, for this example, that multicast receiver 132 is on the access list but that multicast receiver 142 is not on the access list that is included with the multicast session certificate registered in block 234.

In block 260, certificate authority server 150 determines whether the particular multicast receiver that sends the request in block 254 is on the access list included in the multicast session certificate. For example, certificate authority server 150 may identify the applicable multicast session certificate based on the session identifier included in the request of block 254 and then retrieve the information stored for the applicable multicast session certificate to obtain the access list.

If the particular multicast receiver is not on the access list, certificate authority server 150 does not provide the session key to the requesting multicast receiver, as depicted by block 268. For example, as assumed for the example depicted in FIG. 2A and FIG. 2B, multicast receiver 142 is not included in the access list, and therefore certificate authority server 150 does not send the session key to multicast receiver 142. Certificate authority server 150 may send another message to multicast receiver 142 to indicate the denial of the request, or certificate authority server 150 may send no response to the request from multicast receiver 142.

However, if the particular multicast receiver is on the access list, then the process continues to block 264. For example, as assumed for the example depicted in FIG. 2A and FIG. 2B, multicast receiver 132 is included in the access list, and therefore the method continues to block 264.

In block 264, certificate authority server 150 retrieves the session key from the multicast session certificate registered in block 234 and sends the session key to the requesting multicast receiver. For example, certificate authority server 150 may send the session key to multicast receiver 132 in a message that is encrypted with the public key of multicast receiver 132 and signed by the CA using the CA's private key.

In block 270, the authorized multicast receivers receive the session key from certificate authority server 150 and decrypt the multicast communication with the session key using IPsec. For example, multicast receiver 132 may decrypt the message sent by certificate authority server 150 in block 264 using the private key of multicast receiver 132. Once the message of block 264 is decrypted, the session key may be retrieved and used by multicast receiver 132 to decrypt the data that was encrypted and sent by multicast originator 122 in block 240.

As a result of the techniques described herein, multicast communications can be cryptographically secured in a manner that is scalable and that builds on existing security protocols, such as IPsec or SSL/TSL for encryption and CA's and KDC's for facilitating encryption key management, although the techniques described herein are not limited to these particular security protocols and types of authoritative nodes. Multicasts are secured in a connectionless manner so that connections need not be established between the multicast originator and the multicast receivers, such as for negotiating encryption keys and other cryptographic parameters. The examples described above provide for confidentiality and data integrity, and authentication of data origin can be included as described below. Furthermore, expiration times can be used with the session keys to provide additional control, such as to preclude a previous participant that has left the multicast from later being able to decrypt the multicast communications, as described below.

II. Generating Multicast Encryption Configuration Parameters

According to one embodiment, at least one of the following types of encryption configuration parameters are generated and/or selected: a session key, a session identifier, an encryption protocol, an access list, a list of administrative nodes, and a session key expiration time. The generation of the multicast configuration parameters may be performed by one or more nodes, including but not limited to, the multicast originator and the authoritative node.

A. Session Keys

According to an embodiment, each multicast session is encrypted and decrypted using one or more encryption keys, herein referred to as "session keys." The session keys are used together with the selected encryption protocol or protocols to encrypt communications among multicast nodes, such as a multicast from a multicast originator to a group of multicast receivers.

The session keys may be selected using any appropriate encryption key selection approach for a particular implementation. For example, the multicast originator may generate an arbitrary or pseudo-random string of bits or characters to use with an encryption protocol to encrypt data for the multicast. If the encryption protocol for the multicast is IPsec, a router acting as a multicast originator may include an IPsec agent that generates a random session key.

As another example, the multicast originator may use a key negotiation protocol, such as Diffie-Helhnan, with the authoritative node to select a shared key. As yet another example, another entity may provide the session key, such as the authoritative node. The session key may be any type of encryption key, including but not limited to, a shared key, a private key for a public key encryption protocol, or a random string of characters.

B. Session Identifiers

According to an embodiment, each multicast session is associated with one or more identifiers, herein referred to as "multicast session identifiers" or "session identifiers." The session identifiers are used to identity the multicast session by the multicast originator, authoritative node, and multicast recipients and to distinguish a particular multicast session from other multicast sessions. For example, the multicast originator may select a session identifier to be associated with a session key, while the authoritative node may be a CA that creates a multicast session certificate that includes the session identifier and session key. The multicast receivers may identify the session when receiving an encrypted multicast by determining the session identifier that the multicast originator includes in the multicast.

A session identifier may be selected by any suitable means for generating a means for distinguishing a particular multicast session from other multicast sessions. For example, a hostname, an Internet Protocol (IP) address, or a media access control (MAC) address of the multicast originator may be used. As another example, if the multicast is encrypted using IPsec, the security parameter index (SPI) that identifies the security association being used may be selected as the session identifier. As yet another example, a random string of characters or an arbitrary string of characters may be selected as the session identifier, such as a character string that is selected by the multicast originator, authoritative node, or another node or other entity.

C. Encryption Protocols

According to an embodiment, the multicast session is encrypted using an encryption protocol and the selected one or more session keys. For example, at the application layer, SSL/TSL may be used between the multicast originator and multicast receivers. As another example, IPsec may be used to secure the communications between the multicast originator and each multicast receiver. In general, any suitable encryption protocol for securing communications between a source node and a destination node may be used.

In addition to the selected encryption protocol, one or more encryption parameters related to the selected encryption protocol may be specified. For example, if the selected encryption protocol is IPsec, the particular IPsec transform or transforms to be used may be selected. The selected transform should be selected from the transforms available to all participants in the multicast. For example, IPsec includes a list of mandated protocols that all IPsec implementations should support, and selection of a particular transform from such a mandated list should ensure that the multicast receivers can decrypt the IPsec encrypted multicast. Also, because the multicast originator knows who are the intended multicast receivers, the entity generating the multicast can select any transform that is known to be supported by the multicast receivers.

D. Other Parameters

According to other embodiments, additional multicast encryption configuration parameters can be included, including but not limited to, an access list of authorized multicast receivers, a list of administrative nodes that can administer the multicast session, and a session key expiration time, all of which are discussed in detail below.

By selecting the multicast encryption configuration parameters prior to the multicast, the multicast originator does not need to perform complex negotiations with the multicast receivers, resulting in a simple and efficient approach for securing communications among multicast nodes in a telecommunications network.

III. Sending a Session Key to an Authoritative Node

According to an embodiment, the session key is sent by a source node of a multicast to an authoritative node to be stored and later retrieved in response to requests for the session key. In addition, other information besides the session key may be sent to the authoritative node, including but not limited to, a session identifier, an access list, a list of administrative nodes, an expiration time for the session key, additional encryption parameters, or other data.

The source node that sends the session key and associated information to the authoritative node is typically a multicast originator, such as a router acting as the source of the multicast, although other nodes and entities may provide the session key and other information to the authoritative node. The session key and associated information may be sent to the authoritative node in any suitable form, including but not limited to, a request for a multicast session certificate that would contain the session key and associated information.

To ensure the security of the session key and associated information that is sent to the authoritative node, the node sending the session key and associated information can employ one or more encryption protocols and techniques. For example, a multicast originator may send the session key and associated information to the CA in a message that is encrypted with a public key of the CA. The CA may then decrypt the message with the private key that is associated with the public key used by the multicast originator. Furthermore, if the multicast originator has previously registered a public key, the multicast originator can sign the encrypted message with its private key, and then the CA can verify the private key using the public key that was previously registered by the multicast originator. The registered public keys may have been previously registered with the CA, or the public keys may have been previously registered with another authoritative node.

IV. Registering a Session Certificate at an Authoritative Node

According to an embodiment, the authoritative node stores the session key and associated information sent by another node for later retrieval in response to requests for the session key from yet other nodes based on a session identifier that is associated with the session key. The session key and associated data may be stored in a storage device, such as a file or in a database on a server. The stored data includes an association between the session key and session identifier such that the session key may be retrieved based upon the session identifier.

As another example, the session key and associated data may be stored in the form of a certificate by a CA, herein referred to as a "multicast session certificate." The form of the multicast session certificate may be an enhanced version of a typical certificate with additional fields that store the session key and other associated information, such as the session identifier, access list, list of administrative nodes, and expiration time for the session key, and the multicast session certificate may omit fields that are found in a typical certificate. The multicast session certificate may include a new "identity type" that identifies the certificate as being a multicast session certificate to distinguish it from other types of certificates, such as registration certificates that bind a public key to a node's identity.

After storing the session key and associated information at the authoritative node, the authoritative node may send a copy of the stored information back to the node that sent the request to store the session key. For example, a CA may send a copy of the multicast session certificate to the multicast originator that sent the session key and associated information.

To ensure the security of the session key and associated information that is sent to the node that sent the session key and associated information, the authoritative node can employ one or more encryption protocols and techniques. For example, a CA may send the multicast session certificate to the multicast originator in a message that is encrypted with a public key of the multicast originator, such as a public key that was previously registered. The multicast originator may then decrypt the message with the private key that is associated with the public key used by the CA. Furthermore, the CA can sign the encrypted message with a private key, and then the multicast originator can verify the private key using the public key that is provided by the CA.

V. Retrieving a Session Key from an Authoritative Node

According to an embodiment, the session key is retrieved by the authoritative node based on a request that includes the session identifier and that is received from destination node of a multicast, and the session key is provided to the requesting node by the authoritative node in response to the request. In addition, other information that is associated with the session key may be requested by the destination node and provided by the authoritative node, such as the encryption parameters that are to be used with the session key to decrypt the encrypted data in the multicast.

The destination node that requests the session key and other information from the authoritative node is typically a multicast receiver, such as a router acting as the destination of the multicast, although other nodes and entities may request the session key and other information from the authoritative node. The session key and other information may be requested from the authoritative node in any suitable form, including but not limited to, a request for the multicast certificate that is associated with the session identifier that the multicast receiver identifies from the multicast.

To ensure the security of the request for the session key that is sent to the authoritative node, the node sending the request can employ one or more encryption protocols and techniques. For example, a multicast receiver may send the request to the CA in a message that is encrypted with a public key of the CA. The CA may then decrypt the message with the private key that is associated with the public key used by the multicast receiver. Furthermore, if the multicast receiver has previously registered a public key, the multicast receiver can sign the encrypted message with its private key, and then the CA can verify the private key using the public key that was previously registered by the multicast receiver. The registered public keys may have been previously registered with the CA, or the public keys may have been previously registered with another authoritative node.

To ensure the security of the session key and other information that is sent to the requesting node, the authoritative node can employ one or more encryption protocols and techniques. For example, a CA may send the session key and other information to a multicast receiver that requested the session key and associated information in a message that is encrypted with a public key of the multicast receiver. The multicast receiver may then decrypt the message with the private key that is associated with the public key used by the CA. Furthermore, the CA can sign the encrypted message with a private key registered by the CA, and then the multicast receiver can verify the CA's private key using the public key that was previously registered by the CA. The registered public keys may have been previously registered with the CA, or the public keys may have been previously registered with another authoritative node.

VI. Access List of Authorized Nodes

According to an embodiment, a list of authorized nodes is used to control distribution of a session key. The request from the source node of a multicast to an authoritative node to register the session key may include a list of authorized nodes. The authoritative node includes the list of authorized nodes with the information that is stored for the session key. When a request is received from a destination node for the session key, the authoritative node checks the identity of the requesting destination key against the list of authorized nodes. The session key is provided to the requesting destination node only if the requesting destination node is on the list of authorized nodes.

For example, a multicast originator may request that a CA register a session key in a multicast session certificate that includes an access list of multicast receivers that are authorized to receive the session key. When the CA receives a request for the session key, the CA checks to determine whether the requesting multicast receiver is on the access list, and if so, provides the session key. If the requesting multicast receiver is not on the access list, the CA does not provide the session key but may provide a message indicating why the request for the session key is denied.

The list of authorized nodes may be modified to add or remove nodes by the authoritative node for a variety of reasons. For example, the multicast originator may send a message to the CA to change the access list to reflect multicast receivers that have been added and removed from the multicast. The ability to change the access list may be controlled using the list of administrative nodes, as discussed below.

VII. List of Administrative Nodes

According to an embodiment, a list of administrative nodes is used to control which nodes can administer the multicast session. Administration of the multicast session may include, but is not limited to, registering the multicast session certificate with the authoritative node and modifying the certificate, such as by refreshing the encryption key or changing the list of authorized nodes. The list of administrative nodes may be stored as part of the multicast session certificate, or the list of administrative nodes may be maintained separate from the certificate, such as in a separate database that is accessible to the authoritative node.

The list of administrative nodes includes one or more nodes that are typically included in the list of authorized nodes, although that may not always be required. For example, the multicast originator is typically included on the list of administrative nodes, and one or more multicast administrators may also be included. In general, the list of administrative nodes is a subset of the list of authorized nodes, and may often include only one node, such as the multicast originator.

The list of administrative nodes may be used to control which nodes may join (e.g., by specifying the nodes on the list of authorized nodes) and leave the multicast session, as discussed below.

One or more nodes, depending on a particular implementation, may create the list of administrative nodes. For example, the multicast originator may create the list of authoritative nodes and provide the list when registering the multicast session certificate. As another example, the authoritative node may maintain a list of administrative nodes and only allow nodes that are on the list to register a multicast session certificate or modify an existing multicast session certificate.

Each node on the list of administrative nodes may have the same authority to perform administrative functions, such as establishing a multicast session or changing the contents of a multicast certificate, although such need not always be the case. For example, the list of administrative nodes may include a multicast originator that can both establish the multicast session and modify a registered multicast session certificate. The list of administrative nodes may also include a multicast receiver that is allowed to refresh the session key, but is not allowed to modify the list of authorized nodes. Other nodes on the list of administrative nodes may be permitted to perform only one or more of the possible administrative functions as specified in the list of administrative nodes.

VIII. Expiration of a Session Key

According to an embodiment, a session key is valid so long as specified criteria are satisfied, as determined by one or more nodes involved in the multicast or in facilitating the management of the session key for the multicast. For example, an expiration time period may be associated with a session key, and after the expiration time period has elapsed, the session key is no longer valid and the authoritative node will no longer provide the session key to requesting destination nodes. As another example, a specified time may be associated with a session key, after which the multicast receiver no longer uses the session key. As yet another example, a multicast session certificate may be revoked, such as by a multicast originator or the CA, so that the session key is no longer provided to multicast receivers and the revoked status is provided to a multicast receiver that attempts to verify that the multicast session certificate is valid.

The criteria that are used to determine whether and when a session key is no longer valid may be stored by the authoritative node with the session key and associated information. For example, an additional field for an expiration time period or an expiration time may be included by the CA in a multicast session certificate.

A new session key may be generated and registered with the authoritative node for use in place of an expired session key. The new session key may be generated and registered by any node, including but not limited to, the authoritative node and the node that generated the expired session key. For example, if a multicast originator generated the session key that was subsequently registered by a CA and that later expires, the multicast originator may generate a new session key to replace the expired session key. As a result, the multicast originator may be described as having "refreshed" the session key by replacing the expired session key with a new, unexpired session key. Other nodes may refresh a session key, including the authoritative node or one or more other nodes, including a multicast receiver that is part of the multicast session that is using the session key that expires.

IX. Additional Features

According to other embodiments, additional features may be incorporated to secure communications among multicast nodes, including but not limited to, the handling the addition or removal of nodes from the multicast, the authentication of the origin of the multicast, and multicast destination nodes acting as multicast origination nodes in a multicast tree configuration.

A. Addition and Removal of Nodes from a Multicast

When nodes are added or removed from a multicast, the security of the multicast can be ensured by a variety of approaches. For example, a list of authorized nodes can be associated with a session key so that the authoritative node only provides the session key when requested by a node that is included in the list of authorized nodes.

As another example, criteria may be associated with the session key, such as an expiration time period or an expiration time, to limit how long the session key may be used. When a session key is determined to be expired or invalid, another session key must be used for the multicast session.

As yet another example, a node can be added to the multicast by including the additional node in a list of authorized nodes. As a result, the ability of an added node to use a session key or of a removed or departed node to continue to use a session key can be controlled.

As another example, a list of administrative nodes can be associated with a multicast session to control which nodes can administer the multicast session, such as by controlling which nodes can modify a list of authorized nodes.

B. Authenticating the Origin of a Multicast

The use of a session key and an encryption protocol to encrypt a multicast ensures the confidentiality and integrity of the data. However, the origin of the data is not assured by simply using the session key, because all nodes involved in the multicast have access to the session key and may use the session key to send a multicast. To address this problem, the session key may be associated with a source identifier that identifies and distinguishes the source node of the multicast from other nodes. For example, a multicast originator may sign the multicast with a private key that the multicast originator has previously registered with a CA. Upon receipt of the multicast, the multicast receivers can verify the signature of the multicast originator based on the public key that the multicast originator registered with an authoritative node, such as the CA that registered the multicast session certificate, for the private key used by the multicast originator to sign the multicast.

C. Multicast Trees

A multicast may involve only a single source node and a set of destination nodes that decrypt an encrypted multicast and distribute the contents of the multicast to another device or network, such as a LAN, so that a group of users may access the contents of the multicast. However, a multicast may also involve a destination node acting as a source node in sending the multicast on to another set of destination nodes. The destination nodes of the subsequent multicast transmission may be the final destination nodes or may act as source nodes for an additional distribution of the multicast to yet another group of destination nodes. As a result, nodes participating in the multicast may take the form of a multicast tree in which a source node sends a multicast to a set of destination nodes, some or all of which in turn act as source nodes in sending the multicast to additional groups of destination nodes, and so on until the multicast reaches the final destination nodes.

In such a multicast tree, each leg or branch that includes a multicast transmission from one node to one or more other nodes may employ the techniques described herein to secure the communications among the multicast nodes. Each portion of the multicast between the original source node and the final destination nodes may employ the same session key and associated information, or one or more portions may employ a different key and associated information for part of the multicast tree.

X. Hardware Overview

The approach for facilitating secure communications among multicast nodes in a telecommunications network described herein may be implemented in a variety of ways and the invention is not limited to any particular implementation. The approach may be integrated into a computer system or a routing device, or may be implemented as a stand-alone mechanism. Furthermore, the approach may be implemented in computer software, hardware, or a combination thereof.

Figure 3:
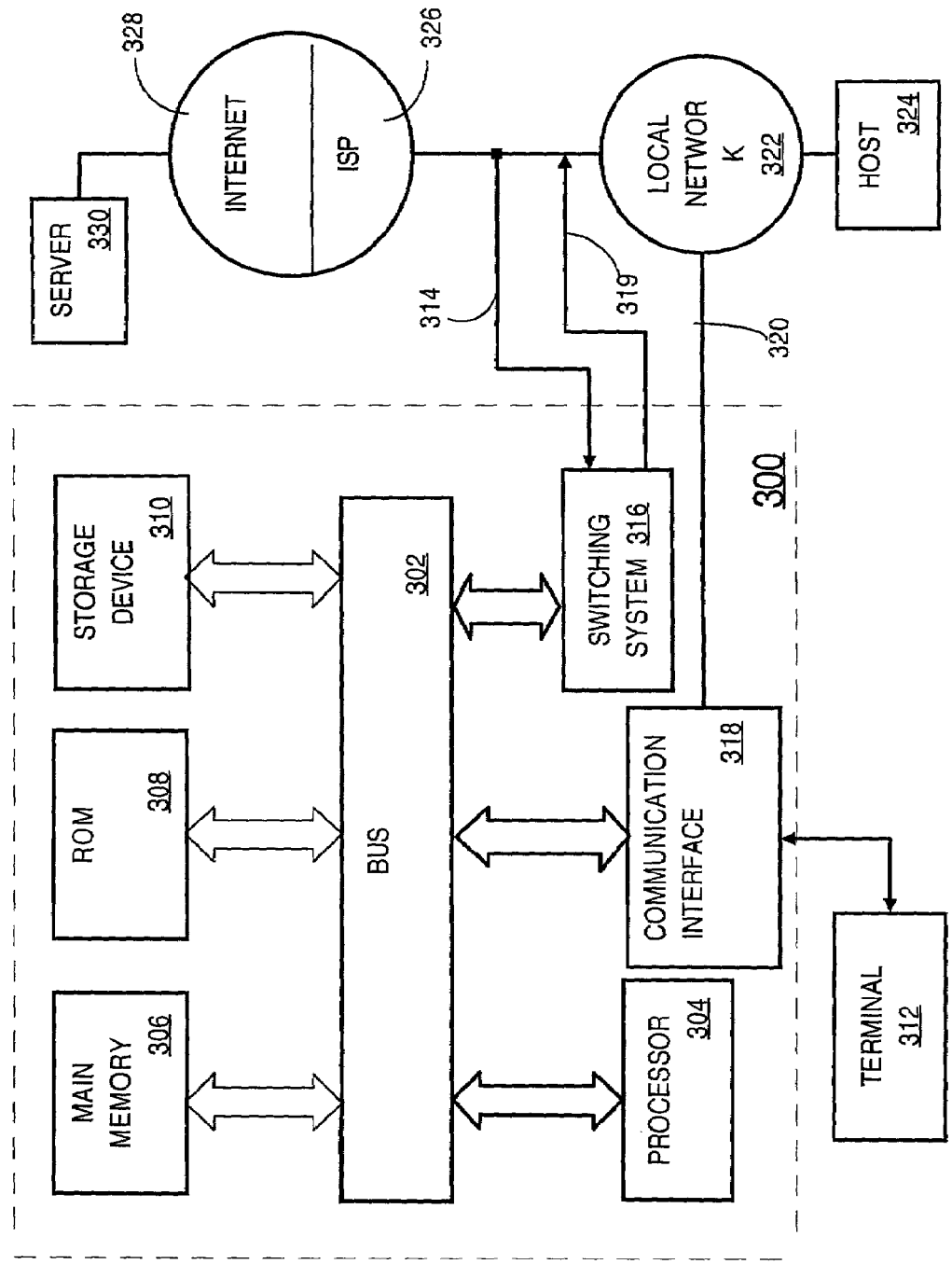
FIG. 3 is a block diagram that illustrates a computer system upon which an embodiment may be implemented.

FIG. 3 is a block diagram that illustrates a computer system 300 upon which an embodiment of the invention may be implemented. The embodiment is implemented using one or more computer programs running on a network element such as a router device. Thus, in this embodiment, the computer system 300 is a router, although the invention is not limited to being implemented in a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Communication interface 318 is a conventional serial interface such as an RS-232 or RS-422 interface. An external terminal 312 or other computer system connects to the computer system 300 and provides commands to it using an input interface 314. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to predetermined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The invention is related to the use of computer system 300 for facilitating secure communications among multicast nodes in a telecommunications network. According to one embodiment of the invention, the facilitation of the secure communications is provided by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for facilitating secure communications among multicast nodes in a telecommunications network as described herein.

The received code may be executed by processor 304 as it is received, and/or stored in storage device 310, or other non-volatile storage for later execution. In this manner, computer system 300 may obtain application code in the form of a carrier wave.

XI. Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for facilitating secure communications among multicast nodes in a telecommunications network, the method comprising the computer-implemented steps of:
   receiving, at an authoritative node from a first node, a first request to store an encryption key, wherein the first request includes an identifier, and wherein the first node uses the encryption key to encrypt data that is multicast with the identifier to a plurality of second nodes;
   in response to the first request,
     the authoritative node storing the encryption key;
     the authoritative node creating and storing an association between the encryption key and the identifier;
   receiving, at the authoritative node from at least one second node of the plurality of second nodes, a second request to obtain the encryption key, wherein the second request includes the identifier;
   in response to the second request,
     based on the identifier included in the second request and the association between the encryption key and the identifier, the authoritative node retrieving the encryption key; and
     the authoritative node sending the encryption key to the at least one second node for use in decrypting the encrypted data.

2. A method as recited in claim 1, wherein:
   the authoritative node is a trusted third party performs the steps of receiving the first request, storing the encryption key, creating and storing the association, receiving the second request, retrieving the encryption key, and sending the encryption key;
   the first request is encrypted based on a first public key that is associated with the trusted third party;
   the first request is signed with a first private key that is associated with the first node;
   the first node is a router that acts as a multicast originator;
   the plurality of second nodes is a plurality of routers that act as multicast receivers;
   the trusted third party is selected from the group consisting of a certificate authority, a key distribution center, a key exchange authority, and a key exchange center;
   the encryption key is selected from the group consisting of a second private key, a shared key, a pseudo-random string of bits, and a pseudo-random string of characters; and
   the method further comprises the computer-implemented steps of:
     prior to sending the encryption key,
       encrypting the encryption key based on a second public key that is associated with the at least one second node; and
       signing the encrypted encryption key with a third private key that is associated with the trusted third party.

3. A method as recited in claim 1, further comprising the computer-implemented steps of:
   registering a certificate that includes the encryption key and the identifier;
   in response to the first request, associating an expiration time with the encryption key;
   in response to the second request, determining based on the expiration time whether the encryption key has expired; and
   when the encryption key has expired, revoking the certificate.

4. A method as recited in claim 1, further comprising the computer-implemented step of:
   generating the encryption key based on an Internet key exchange protocol with the first node.

5. A method as recited in claim 1, wherein:
   the first node uses the encryption key and Internet protocol security (IPsec) to encrypt the data that is multicast; and
   the at least one second node decrypts the encrypted data based on the encryption key and IPsec.

6. A method as recited in claim 1, further comprising the computer-implemented steps of:
   storing a first list of nodes;
   in response to the first request, determining whether the first node is included in the first list of nodes;
   when the first node is included in the first list of nodes, performing the steps of storing the encryption key and creating and storing the association between the encryption key and the identifier;
   in response to the first request, storing a second list of nodes;
   in response to the second request, determining whether the at least one second node is included in the second list of nodes; and
   when the at least one second node is included in the second list of nodes, performing the steps of retrieving and sending the encryption key.

7. A method as recited in claim 1, wherein the encryption key is an old encryption key, the identifier is an old identifier, and the association is an old association, and further comprising the steps of:
   in response to the first request, associating one or more criteria with the encryption key;
   in response to the second request, determining based on the one or more criteria whether the encryption key is valid; and
   when the encryption key is not valid,
     receiving a third request to store a new encryption key, wherein the third request includes a new identifier, and wherein the new encryption key is used to encrypt additional data that is multicast with the new identifier to the plurality of second nodes;
     in response to the third request,
       storing the new encryption key;
       creating and storing a new association between the new encryption key and the new identifier;
     receiving, from at least one additional second node of the plurality of second nodes, a fourth request to obtain the new encryption key, wherein the fourth request includes the new identifier;
     in response to the fourth request,
       based on the new identifier included in the fourth request and the new association between the new encryption key and the new identifier, retrieving the new encryption key; and sending the new encryption key to the at least one additional second node for use in decrypting the encrypted data.

8. A method as recited in claim 1, wherein:
the identifier is a session identifier;
the encrypted data is multicast with an originator identifier that is based on an identity of the first node;
the second request includes an unverified originator identifier; and
further comprising the computer-implemented steps of:
in response to the first request, associating the originator identifier with the session identifier; and
in response to the second request, determining whether the unverified originator identifier is valid based on the originator identifier and informing the at least one second node whether the unverified originator is valid.

9. A method as recited in claim 1, wherein the identifier is selected from the group consisting of a hostname, an Internet protocol address, a media access control address, an Internet security protocol security parameter index, a first string of pseudo-random bits, a second string of pseudo-random characters, a third string of arbitrary bits, and a fourth string of arbitrary characters.

10. A method for encrypting communications among multicast nodes in a telecommunications network, the method comprising the computer-implemented steps of:
an originating node sending a first request to store an encryption key and an identifier to an authoritative node;
wherein the authoritative node, in response to the first request, (a) stores the encryption key and (b) creates and stores an association between the encryption key and the identifier;
the originating node encrypting data based on the encryption key; and
the originating node multicasting the encrypted data with the identifier to one or more receiving nodes, wherein:
at least one receiving node of the one or more receiving nodes (a) sends a second request to obtain the encryption key to the authoritative node, wherein the second request includes the identifier, and (b) decrypts the encrypted data based on the encryption key that the at least one receiving node receives from the authoritative node; and
the authoritative node, in response to the second request, (a) retrieves the encryption key, based on the identifier included in the second request and the association between the encryption key and the identifier, and (b) sends the encryption key to the at least one receiving node for use in decrypting the encrypted data.

11. A method for decrypting encrypted communications among multicast nodes in a telecommunications network, the method comprising the computer-implemented steps of:
a receiving node receiving from an originating node a multicast that includes encrypted data and an identifier, wherein:
the encrypted data is encrypted by the originating node based on an encryption key;
the authoritative node receives a first request from the originating node to store the encryption key, wherein the first request includes an identifier;
in response to the first request, the authoritative node (a) stores the encryption key and (b) creates and stores an association between the encryption key and the identifier;
the receiving node identifying the identifier from the multicast;
the receiving node sending a second request to obtain the encryption key that includes the identifier to the authoritative node to obtain an encryption key used by the originating node to encrypt the encrypted data, wherein:
the authoritative node, in response to the second request, (a) retrieves the encryption key, based on the identifier included in the second request and the association between the encryption key and the identifier, and (b) sends the encryption key for use in decrypting the encrypted data;
in response to sending the second request to the authoritative node, the receiving node receiving the encryption key; and
the receiving node decrypting the encrypted data based on the encryption key.

12. A method for a certificate authority to facilitate communications based on Internet protocol security (IPsec) among multicast nodes in a telecommunications network, the method comprising the computer-implemented steps of:
receiving, at the certificate authority from a first router that acts as a multicast originator, a first request to register an encryption key, wherein the first request includes a multicast session identifier and a list of authorized multicast receivers, and wherein the first router uses the encryption key to encrypt data based on IPsec and multicasts the encrypted data with the multicast session identifier to a plurality of second routers that act as multicast receivers;
in response to the first request, the certificate authority creating and storing a multicast session certificate that includes the encryption key, the multicast session identifier, and the list of authorized multicast receivers;
receiving, at the certificate authority from at least a particular second router of the plurality of second routers, a second request to obtain the encryption key, wherein the second request includes the multicast session identifier;
in response to the second request,
determining whether the particular second router is included in the list of authorized multicast receivers;
when the particular second router is included in the list of authorized multicast receivers,
based on the multicast session identifier included in the second request and the multicast session certificate, the certificate authority retrieving the encryption key; and
the certificate authority sending the encryption key to the particular second router for use in decrypting the encrypted data based on IPsec.

13. A computer-readable storage medium carrying one or more sequences of instructions for facilitating secure communications among multicast nodes in a telecommunications network, which instructions, when executed by one or more processors, cause the one or more processors to carry out the steps of:
receiving, at an authoritative node from a first node, a first request to store an encryption key, wherein the first request includes an identifier, and wherein the first node uses the encryption key to encrypt data that is multicast with the identifier to a plurality of second nodes;

in response to the first request,
  the authoritative node storing the encryption key;
  the authoritative node creating and storing an association between the encryption key and the identifier;
receiving, at the authoritative node from at least one second node of the plurality of second nodes, a second request to obtain the encryption key, wherein the second request includes the identifier;
in response to the second request,
  based on the identifier included in the second request and the association between the encryption key and the identifier, the authoritative node retrieving the encryption key; and
  the authoritative node sending the encryption key to the at least one second node for use in decrypting the encrypted data.

14. A computer-readable storage medium carrying one or more sequences of instructions for encrypting communications among multicast nodes in a telecommunications network, cause the one or more processors to carry out the steps of:
  an originating node sending a first request to store an encryption key and an identifier to an authoritative node;
    wherein the authoritative node, in response to the first request, (a) stores the encryption key and (b) creates and stores an association between the encryption key and the identifier;
  the originating node encrypting data based on the encryption key; and
  the originating node multicasting the encrypted data with the identifier to one or more receiving nodes, wherein:
    at least one receiving node of the one or more receiving nodes (a) sends a second request to obtain the encryption key to the authoritative node, wherein the second request includes the identifier, and (b) decrypts the encrypted data based on the encryption key that the at least one receiving node receives from the authoritative node; and
    the authoritative node, in response to the second request, (a) retrieves the encryption key, based on the identifier included in the second request and the association between the encryption key and the identifier, and (b) sends the encryption key to the at least one receiving node for use in decrypting the encrypted data.

15. An apparatus for facilitating secure communications among multicast nodes in a telecommunications network, comprising:
  means for receiving, at an authoritative node from a first node, a first request to store an encryption key, wherein the first request includes an identifier, and wherein the first node uses the encryption key to encrypt data that is multicast with the identifier to a plurality of second nodes;
  means for the authoritative node storing the encryption key, in response to the first request;
  means for the authoritative node creating and storing an association between the encryption key and the identifier, in response to the first request;
  means for receiving, at the authoritative node from at least one second node of the plurality of second nodes, a second request to obtain the encryption key, wherein the second request includes the identifier;
  means for the authoritative node retrieving the encryption key, in response to the second request and based on the identifier included in the second request and the association between the encryption key and the identifier; and
  means for the authoritative node sending the encryption key to the at least one second node for use in decrypting the encrypted data, in response to the second request.

16. An apparatus for encrypting communications among multicast nodes in a telecommunications network, comprising:
  means for an originating node sending a first request to store an encryption key and an identifier to an authoritative node;
    wherein the authoritative node, in response to the first request, (a) stores the encryption key and (b) creates and stores an association between the encryption key and the identifier;
  means for the originating node encrypting data based on the encryption key; and
  means for the originating node multicasting the encrypted data with the identifier to one or more receiving nodes, wherein:
    at least one receiving node of the one or more receiving nodes (a) sends a second request to obtain the encryption key to the authoritative node, wherein the second request includes the identifier, and (b) decrypts the encrypted data based on the encryption key that the at least one receiving node receives from the authoritative node; and
    the authoritative node, in response to the second request, (a) retrieves the encryption key, based on the identifier included in the second request and the association between the encryption key and the identifier, and (b) sends the encryption key to the at least one receiving node for use in decrypting the encrypted data, the one or more receiving nodes use the identifier to retrieve the encryption key from the authoritative node and decrypt the encrypted data based on the encryption key.

17. An apparatus for facilitating secure communications among multicast nodes in a telecommunications network, comprising:
  a processor;
  one or more stored sequences of instructions which, when executed by the processor, cause the processor to carry out the steps of:
    receiving, at an authoritative node from a first node, a first request to store an encryption key, wherein the first request includes an identifier, and wherein the first node uses the encryption key to encrypt data that is multicast with the identifier to a plurality of second nodes;
    in response to the first request,
      the authoritative node storing the encryption key;
      the authoritative node creating and storing an association between the encryption key and the identifier;
    receiving, at the authoritative node from at least one second node of the plurality of second nodes, a second request to obtain the encryption key, wherein the second request includes the identifier;
    in response to the second request,
      based on the identifier included in the second request and the association between the encryption key and the identifier, the authoritative node retrieving the encryption key; and the authoritative node sending the encryption key to the at least one second node for use in decrypting the encrypted data.

18. An apparatus for encrypting communications among multicast nodes in a telecommunications network, comprising:
a processor;
one or more stored sequences of instructions which, when executed by the processor, cause the processor to carry out the steps of:
an originating node sending a first request to store an encryption key and an identifier to an authoritative node;
wherein the authoritative node, in response to the first request, (a) stores the encryption key and (b) creates and stores an association between the encryption key and the identifier;
the originating node encrypting data based on the encryption key; and
the originating node multicasting the encrypted data with the identifier to one or more receiving nodes, wherein:
at least one receiving node of the one or more receiving nodes (a) sends a second request to obtain the encryption key to the authoritative node, wherein the second request includes the identifier, and (b) decrypts the encrypted data based on the encryption key that the at least one receiving node receives from the authoritative node; and
the authoritative node, in response to the second request, (a) retrieves the encryption key, based on the identifier included in the second request and the association between the encryption key and the identifier, and (b) sends the encryption key to the at least one receiving node for use in decrypting the encrypted data.

19. An apparatus as recited in claim 15, wherein:
the means for receiving the first request, storing the encryption key, creating and storing the association, receiving the second request, retrieving the encryption key, and sending the encryption key are included in a trusted third party;
the trusted third party is the authoritative node;
the first request is encrypted based on a first public key that is associated with the trusted third party;
the first request is signed with a first private key that is associated with the first node;
the first node is a router that acts as a multicast originator;
the plurality of second nodes is a plurality of routers that act as multicast receivers;
the trusted third party is selected from the group consisting of a certificate authority, a key distribution center, a key exchange authority, and a key exchange center;
the encryption key is selected from the group consisting of a second private key, a shared key, a pseudo-random string of bits, and a pseudo-random string of characters; and
the apparatus further comprises:
means for encrypting, prior to sending the encryption key, the encryption key based on a second public key that is associated with the at least one second node; and
means for signing, prior to sending the encryption key, the encrypted encryption key with a third private key that is associated with the trusted third party.

20. An apparatus as recited in claim 15, further comprising:
means for registering a certificate that includes the encryption key and the identifier;
means for associating, in response to the first request, an expiration time with the encryption key;
means for determining, in response to the second request, based on the expiration time whether the encryption key has expired; and
means for revoking the certificate when the encryption key has expired.

21. An apparatus as recited in claim 15, further comprising:
means for generating the encryption key based on an Internet key exchange protocol with the first node.

22. An apparatus as recited in claim 15, wherein:
the first node uses the encryption key and Internet protocol security (IPsec) to encrypt the data that is multicast; and
the at least one second node decrypts the encrypted data based on the encryption key and IPsec.

23. An apparatus as recited in claim 15, further comprising:
means for storing a first list of nodes;
means for determining, in response to the first request, whether the first node is included in the first list of nodes;
means for causing, when the first node is included in the first list of nodes, the storing of the encryption key and the creating and storing of the association between the encryption key and the identifier;
means for storing, in response to the first request, a second list of nodes;
means for determining, in response to the second request, whether the at least one second node is included in the second list of nodes; and
means for causing, when the at least one second node is included in the second list of nodes, the retrieving and sending of the encryption key.

24. An apparatus as recited in claim 15, wherein the encryption key is an old encryption key, the identifier is an old identifier, and the association is an old association, and further comprising:
means for associating, in response to the first request, one or more criteria with the encryption key;
means for determining, in response to the second request, based on the one or more criteria whether the encryption key is valid;
means for receiving, when the encryption key is not valid, a third request to store a new encryption key, wherein the third request includes a new identifier, and wherein the new encryption key is used to encrypt additional data that is multicast with the new identifier to the plurality of second nodes;
means for storing, in response to the third request, the new encryption key;
means for creating and storing, in response to the third request, a new association between the new encryption key and the new identifier;
means for receiving, from at least one additional second node of the plurality of second nodes, a fourth request to obtain the new encryption key, wherein the fourth request includes the new identifier;
means for retrieving, in response to the fourth request, the new encryption key, based on the new identifier included in the fourth request and the new association between the new encryption key and the new identifier; and means for sending, in response to the fourth request, the new encryption key to the at least one additional second node for use in decrypting the encrypted data.

25. An apparatus as recited in claim 15, wherein:

the identifier is a session identifier;

the encrypted data is multicast with an originator identifier that is based on an identity of the first node;

the second request includes an unverified originator identifier; and further comprising:

means for associating, in response to the first request, the originator identifier with the session identifier; and means for determining, in response to the second request, whether the unverified originator identifier is valid based on the originator identifier and informing the at least one second node whether the unverified originator is valid.

26. An apparatus as recited in claim 15, wherein the identifier is selected from the group consisting of a hostname, an Internet protocol address, a media access control address, an Internet security protocol security parameter index, a first string of pseudo-random bits, a second string of pseudo-random characters, a third string of arbitrary bits, and a fourth string of arbitrary characters.

27. An apparatus as recited in claim 17, wherein:

the apparatus is part of a trusted third party;

the trusted third party is the authoritative node;

the first request is encrypted based on a first public key that is associated with the trusted third party;

the first request is signed with a first private key that is associated with the first node;

the first node is a router that acts as a multicast originator;

the plurality of second nodes is a plurality of routers that act as multicast receivers;

the trusted third party is selected from the group consisting of a certificate authority, a key distribution center, a key exchange authority, and a key exchange center;

the encryption key is selected from the group consisting of a second private key, a shared key, a pseudo-random string of bits, and a pseudo-random string of characters; and the apparatus further comprises one or more stored sequences of instructions which, when executed by the processor, cause the processor to carry out the steps of:

prior to sending the encryption key, encrypting the encryption key based on a second public key that is associated with the at least one second node; and signing the encrypted encryption key with a third private key that is associated with the trusted third party.

28. An apparatus as recited in claim 17, further comprising one or more stored sequences of instructions which, when executed by the processor, cause the processor to carry out the steps of:

registering a certificate that includes the encryption key and the identifier;

in response to the first request, associating an expiration time with the encryption key;

in response to the second request, determining based on the expiration time whether the encryption key has expired; and when the encryption key has expired, revoking the certificate.

29. An apparatus as recited in claim 17, further comprising one or more stored sequences of instructions which, when executed by the processor, cause the processor to carry out the step of:

generating the encryption key based on an Internet key exchange protocol with the first node.

30. An apparatus as recited in claim 17, wherein:

the first node uses the encryption key and Internet protocol security (IPsec) to encrypt the data that is multicast; and the at least one second node decrypts the encrypted data based on the encryption key and IPsec.

31. An apparatus as recited in claim 17, further comprising one or more stored sequences of instructions which, when executed by the processor, cause the processor to carry out the steps of:

storing a first list of nodes;

in response to the first request, determining whether the first node is included in the first list of nodes;

when the first node is included in the first list of nodes, performing the steps of storing the encryption key and creating and storing the association between the encryption key and the identifier;

in response to the first request, storing a second list of nodes;

in response to the second request, determining whether the at least one second node is included in the second list of nodes; and when the at least one second node is included in the second list of nodes, performing the steps of retrieving and sending the encryption key.

32. An apparatus as recited in claim 17, wherein the encryption key is an old encryption key, the identifier is an old identifier, and the association is an old association, and further comprising one or more stored sequences of instructions which, when executed by the processor, cause the processor to carry out the steps of:

in response to the first request, associating one or more criteria with the encryption key;

in response to the second request, determining based on the one or more criteria whether the encryption key is valid; and when the encryption key is not valid, receiving a third request to store a new encryption key, wherein the third request includes a new identifier, and wherein the new encryption key is used to encrypt additional data that is multicast with the new identifier to the plurality of second nodes;

in response to the third request, storing the new encryption key;

creating and storing a new association between the new encryption key and the new identifier;

receiving, from at least one additional second node of the plurality of second nodes, a fourth request to obtain the new encryption key, wherein the fourth request includes the new identifier;

in response to the fourth request, based on the new identifier included in the fourth request and the new association between the new encryption key and the new identifier, retrieving the new encryption key; and sending the new encryption key to the at least one additional second node for use in decrypting the encrypted data.

33. An apparatus as recited in claim 17, wherein:
  the identifier is a session identifier;
  the encrypted data is multicast with an originator identifier that is based on an identity of the first node;
  the second request includes an unverified originator identifier; and
further comprising one or more stored sequences of instructions which, when executed by the processor, cause the processor to carry out the steps of:
  in response to the first request, associating the originator identifier with the session identifier; and
  in response to the second request, determining whether the unverified originator identifier is valid based on the originator identifier and informing the at least one second node whether the unverified originator is valid.

34. An apparatus as recited in claim 17, wherein the identifier is selected from the group consisting of a hostname, an Internet protocol address, a media access control address, an Internet security protocol security parameter index, a first string of pseudo-random bits, a second string of pseudo-random characters, a third string of arbitrary bits, and a fourth string of arbitrary characters.

* * * * *